United States Patent [19]

Knecht et al.

[11] Patent Number: 4,790,192
[45] Date of Patent: Dec. 13, 1988

[54] SILICON SIDE BY SIDE COPLANAR PRESSURE SENSORS

[75] Inventors: Thomas A. Knecht, Chanhassen; Mark G. Romo, Eden Prairie, both of Minn.

[73] Assignee: Rosemount Inc., Eden Prairie, Minn.

[21] Appl. No.: 100,488

[22] Filed: Sep. 24, 1987

[51] Int. Cl.$^4$ ............................ G01L 7/08; G01L 9/06
[52] U.S. Cl. ........................................ 73/721; 73/754; 73/DIG. 4; 338/4
[58] Field of Search ................. 73/721, 720, 717, 718, 73/719, 722, 727, 756, 754, DIG. 4; 338/4, 42; 29/610 SG

[56] References Cited

U.S. PATENT DOCUMENTS

| | | | |
|---|---|---|---|
| 2,336,500 | 12/1943 | Osterberg | 73/720 |
| 3,909,924 | 10/1975 | Vindasius et al. | 29/574 |
| 3,930,412 | 1/1976 | Mallon et al. | 73/398 AR |
| 4,131,088 | 12/1978 | Reddy | 123/32 EJ |
| 4,222,277 | 9/1980 | Kurtz et al. | 73/721 |
| 4,287,501 | 9/1981 | Tominaga et al. | 338/42 |
| 4,326,423 | 4/1982 | Hartsmann | 73/721 |
| 4,528,855 | 7/1985 | Singh | 73/721 |
| 4,565,096 | 1/1986 | Knecht | 73/718 |
| 4,730,496 | 3/1988 | Knecht et al. | 73/718 |

Primary Examiner—Donald O. Woodiel
Attorney, Agent, or Firm—Kinney & Lange

[57] ABSTRACT

A pressure sensor that provides for multiple diaphragm sensing regions in a side by side configuration which can be formed into a stacked monolithic batch fabricated form. The multiple pressure sensor can be constructed to sense differential or absolute pressure as desired. In preferred forms of the invention, the pressure inlets are all on the same side of the monolithic structure to easily isolate the corrosive pressure media from the sensing means, which as shown comprise strain gage sensors on the sensing diaphragms as well as from the conductors carrying signals from the sensing means. The variable strain gage resistors on the sensor diaphragms are segregated from the media in several differet ways using isolating layers. The stacked sensor configuration insures that the device can be batched fabricated so that a number of sensors can be formed on chips that are stacked and bonded together, and then separated into individual sensors.

18 Claims, 9 Drawing Sheets

SILICON SIDE BY SIDE COPLANAR PRESSURE SENSORS

CROSS REFERENCE TO RELATED APPLICATION

Reference is made to copending application Ser. No. 891,261, filed July 28, 1986 for Media Isolated Differential Pressure Sensor.

BACKGROUND OF THE INVENTION

1. Field of the Invention

The present invention relates to a media isolated, multiple pressure sensor that has side-by-side sensor portions and which can be formed in a batch fabricating process.

2. Description of the Prior Art

Batch fabrication procedures are presently used for manufacturing pressure sensors. Known pressure sensors which sense two or more pressures also have been known. However, multiple pressure sensors on the market can be difficult to manufacture and may not provide adequate isolation of the sensing diaphragms, the sensing means on the diaphragms, and/or the electrical conductors from the pressure media or fluid. The pressure sensing media can be corrosive and can damage critical sensing parts and conductors if the pressure media contacts such parts.

SUMMARY OF THE INVENTION

The present invention relates to multiple pressure sensors that have media isolated sensing elements and provides two outputs representing pressures of sensed fluid media. The sensors have pressure sensing diaphragms, suitable mounting bases, and sufficient additional layers to provide the necessary chambers for directing the pressure media to the correct surfaces of sensing diaphragms or, if desired, for providing a reference pressure on one side of a diaphragm.

The batch fabrication comprises assembling or stacking a plurality of wafers or layers of selected materials that are suitably etched to form the needed configurations, and to form or apply the sensing means, and then bonding the layers together so that a number or batch of sensors can be formed at the same time. The layers can be etched additionally after bonding the layers together, if desired, and then the individual sensors can be separated out.

Preferably, the sensing means or sensing elements used comprise strain gages that are formed by diffusion or deposition on the respective sensing diaphragm. The individual wafers or layers that are used for forming the final sensor package, when suitably bonded (for example, by anodic, eutectic or frit bonding) together, form a monolithic structure that can be cut (diced) into the individual sensors.

The construction can be made so that the side by side sensing diaphragms form sensor portions which can be used for sensing differential and absolute pressures with the same sensor, or the sensor can sense two absolute pressures, or two differential pressures. In each of the configurations, the sensing elements are isolated from the pressure media, either by a protective coating or by a separate isolator layer or housing.

Preferably, the sensors have coplanar input ports for admitting pressurized fluid to the respective sensor portions. The coplanar ports permit easily isolating the sensing means and the electrical conductors and contact pads used with the sensing means from the pressure media.

The techniques of forming diaphragms, including those which have overpressure stops, and etching away portions of silicon or glass layers is known in the prior art. These known fabrication techniques are used for preparing the components for making a coplanar sensor that provides multiple pressure sensing functions and maintains the critical elements isolated from the pressurized fluid media.

DETAILED DESCRIPTION OF THE PREFERRED EMBODIMENTS

A first form of the invention shown in FIGS. 1–7 comprises a pressure sensing cell (or sensor) indicated generally at 10 that is made according to the present invention and which is mounted within a housing member or case indicated generally at 11. The case, as shown, has three pressure input ports 12, 13 and 14, respectively, and as will be explained the input ports are coupled to sources of pressures (pressure media) to be sensed. The pressure ports 12 and 13 are formed on one wall of a main case portion 15, and the pressure port 14 is formed in the cover portion 16 of the case 11.

Figure 1:
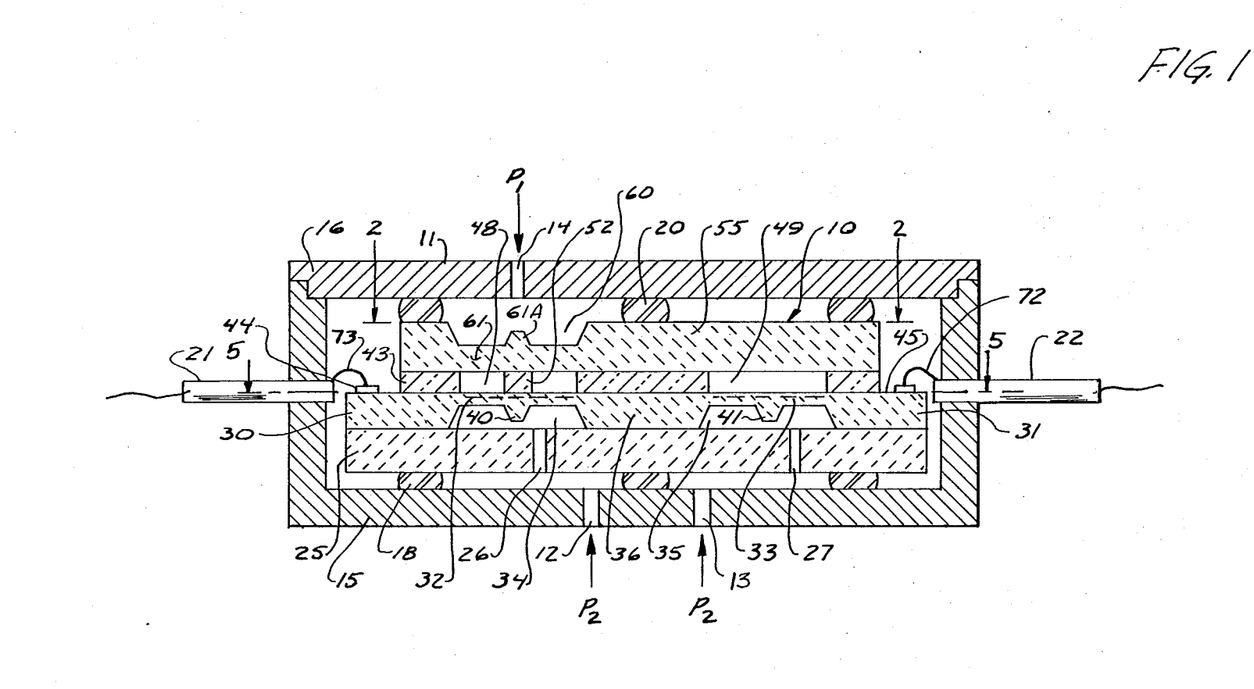
FIG. 1 is a cross sectional view of a pressure sensor made according to the present invention and shown mounted in an outer case for use.
Figure 2:
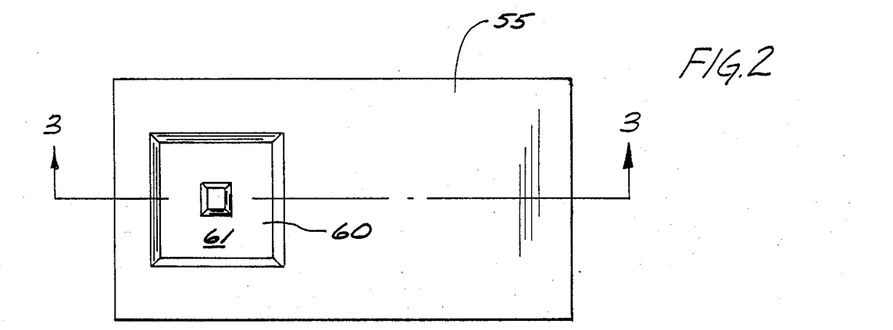
FIG. 2 is a top plan view of an upper layer of the pressure sensor of FIG. 1 taken as on line 2—2 in FIG. 1.
Figure 3:
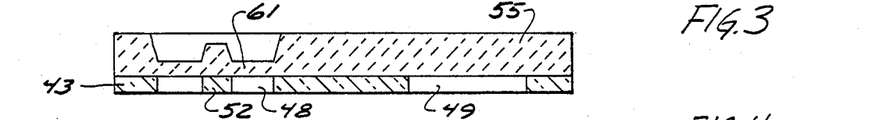
FIG. 3 is a sectional view taken as on line 3—3 in FIG. 2 and showing two upper layers of the pressure sensor.
Figure 4:
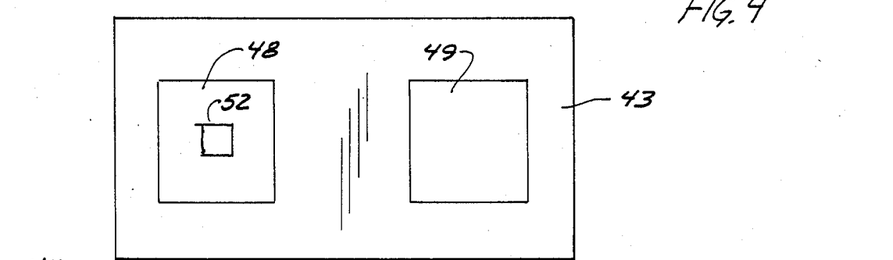
FIG. 4 is a bottom plan view of the layers of the pressure sensor shown in FIG. 3.

The sensing cell or sensor 10 is supported within the case 11 on rings 18 that suitably seal the pressure port openings 12 and 13 with respect to the sensing cell 10, and resilient gaskets 20 are provided at the upper side of the sensing cell 10 to seal off desired areas overlying the sensing cell.

Lead through members 21 and 22 are provided for carrying leads from the sensing cell 10 through the side walls of the case. The case 11 can be rectangular, or circular as desired, as can the outer periphery of the sensing cell 10. However, as will be shown, the sensing cell 10 is preferably rectangular in shape for ease of batch processing.

The sensing cell 10 includes a base or mounting layer 25 that is initially formed from a wafer of a brittle, rigid material such as glass or silicon, and the base 25 has passageways 26 and 27 therein that are open to the respective ports 12 and 13 in the outer case. The sensing cell 10 further includes a diaphragm assembly layer 30, which has an outer rim 31 around the periphery, and as shown has side by side diaphragm members 32 and 33, respectively. The diaphragm members 32 and 33 are formed by etching cavities or recesses 34 and 35 into one surface of the layer, to define outer rims, and also to define a center divider rim portion 36 that forms a support between the diaphragms 32 and 33.

Figure 7:
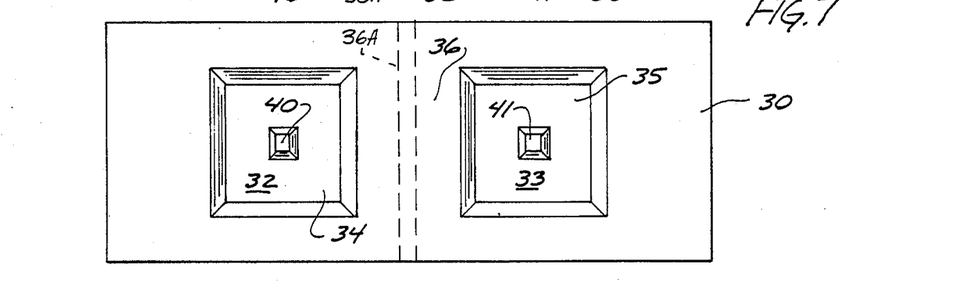
FIG. 7 is a bottom plan view of the layer shown in FIG. 6.

FIG. 7 shows the rim and diaphragm sections and the cavities 34 and 35. The support rim 31 extends all the way around the cavities or recesses 34 and 35, respectively, and the center rim portion 36 is wide, as is the outer rim, to provide adequate support for the diaphragms 32 and 33.

Overpressure stop bosses 40 and 41 are formed with and extend the diaphragms, and they face the base 25 so that if overpressure occurs the bosses 40 and 41 will stop against the base 25 before damage is caused to the diaphragms. The spacing is exaggerated as shown, because the wafer 30 is preferably made of a brittle semiconductor, such as silicon, and the amount of full-scale deflection that is permitted is very small. It should be noted also that the passageways 26 and 27 are offset from the center of the diaphragms so that the stop bosses 40 and 41 can contact the facing surface of the base 25 without plugging passageways 26, 27.

A relatively thin glass layer 43 is placed over the diaphragm assembly 30. It will be etched to be shorter than the diaphragm assembly 30 in final assembly so that the diaphragm wafer or layer has exposed end surface portions indicated generally at 44 and 45 which provide a pressure media isolated location for bond wires and contact pads. The glass layer 43 can be made as a large disc or wafer, and then etched away in desired locations after being bonded to an upper layer for providing passageways or openings and to be the desired length. As shown, the glass layer 43 is etched to provide a through hole or cavity 49 directly above the diaphragm 33, and a cavity or hole 48 is provided through the glass layer 43 above the diaphragm 32. The hole 48 has a center post 52 left in the center thereof that aligns with the post or stop member 40 on diaphragm 32 and thus is in the center of the diaphragm 32 but on the opposite side of the diaphragm 32 from stop member 40. The post 52 forms a force or motion coupling post from diaphragm 32 to an upper isolator diaphragm assembly layer or wafer 55.

In manufacture, the glass layer 43 is preferably first bonded in a suitable manner to the surface of the layer 55 that forms an isolator diaphragm, and then the cavities or holes 48 and 49 are etched in place. The outer periphery of layer 43 also can be etched to proper size, or the outer periphery can be cut to leave an exposed surface for the contact pads on the diaphragm layer when the glass layer 43 and its attached isolator layer 55 is bonded to the sensing assembly 30.

The upper isolator diaphragm layer 55 overlies and closes the cavity or hole 49 to make this cavity into a chamber overlying the diaphragm 33. The chamber formed by hole 49 is a reference pressure chamber because it is evacuated when the respective silicon wafers and glass layers are bonded together to form a monolithic pressure sensor.

The isolator diaphragm layer 55 has a recess or cavity 60 etched therein on a side thereof opposite from glass layer 43, that when assembled substantially overlies the recess 34 in sensing diaphragm assembly layer 30. The recess 60 forms a diaphragm member 61 that is open to the upper side of the sensor cell, and thus open to the port 14 and the cover 16 of the sensor case or housing. The gasket members 20 are provided fluidly to surround port 14 to isolate the diaphragm 61, so that pressure will act on the diaphragm 61 when fluid under pressure is admitted through the port 14.

Figure 5:
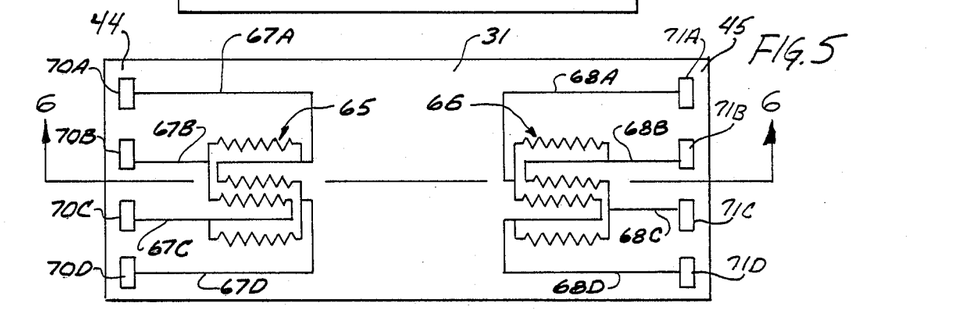
FIG. 5 is a top plan view of a layer of the sensor in FIG. 1 which has sensing means thereon and taken on line 5—5 in FIG. 1.

The sensing diaphragms 32 and 34 are provided with sensing means comprising resistance strain gages that can be deposited or diffused into the surfaces of the respective diaphragms and form sensing means for sensing deflection of the diaphragms. This diffusion is represented by dashed lines adjacent the upper portion of the diaphragms 32 and 33 on the surface facing the chambers formed by cavities or holes 48 and 49. As shown in FIG. 5, the strain gages comprise two sets of individual piezoresistive or strain gage resistors or elements shown generally at 65 and 66. These strain gage elements of each set are formed into a bridge circuit in a known manner. A plurality of conductors or leads 67A-67B lead from the strain gage elements 65, and conductors or leads 68A-68D are connected to the strain gage elements 66. The electrical conductors 67A and 68A are disposed on the surface of the silicon diaphragm assembly layer or wafer 30 and extend outwardly toward the surface regions 44 and 45. In these regions 44 and 45, contact or bonding pads 70A-70D are coupled to the conductors 67A-67D, respectively and contact or bonding pads 71A-71D are electrically connected to the conductors 68A-68D, respectively. The bonding pads have leads indicated generally at 72 and 73 (FIG. 1) electrically connected thereto, which pass through the feed through terminals 21 and 22 to the exterior of the case 11, for connection to suitable remote circuitry.

The wafer or layer 55 and the glass layer 43 are bonded together as a unit as was mentioned, and then the diaphragm assembly layer or wafer 30 (with diaphragms 32 and 33 formed thereon), and the mounting or base layer 25 are all bonded together as a unit in a vacuum, so that the chamber formed by opening 49 is under a vacuum, as is the chamber formed by opening 48.

The sensor cell 10, when it is finished, that is after the passageways 26 and 27 have been drilled through base 25 and all of the etching is done, is a monolithic sensor structure. The sensor is placed into the base portion 15, on top of the seal members 18 that seal off the two pressure ports or inlets 12 and 13, and then the cover 16 is put into place and sealed hermetically while the seals or gaskets 18 and 20 are maintained under compression.

A first fluid pressure $P_1$ is provided to port 14 and a second fluid pressure $P_2$ is provided to both of the ports 12 and 13. Therefore, the pressure sensed by the diaphragm 33, which is indicated by signals from the strain gage elements 66, and carried through the conductors 73 will be absolute pressure, that is, the level of pressure $P_2$ with reference to a vacuum. The pressure indicated by the strain gage elements 65 on the diaphragm 32, however, will be a differential pressure. The deflection of diaphragm 32 is proportional to differential between presures $P_1$ and $P_2$. The diaphragms 31 and 32 are coupled to move together by post 52.

It can be seen that the electrical conductors leading from the strain gage sensing element bridges and the leads that couple to the bonding pads 70A-70D and 71A-71D are completely isolated from the fluid media being sensed. Isolation layer or wafer 55 isolates the sensing diaphragms 32 and 33, and yet there is active deflection of the diaphragm 32 for providing adequate output for sensing differential pressure, while the chamber formed by cavity or hole 49 that is under vacuum permits diaphragm 33 to deflect to indicate absolute pressure. Overpressure stop or lug 40 prevents excessive deflection under large differentials between $P_1$ and $P_2$. The stop 41 as shown is not normally operable, but permits symetrically forming the diaphragms 32 and 33 operable and under certain conditions when $P_2$ is a vacuum.

The upwardly extending center post 61A on diaphragm 61 overlies the center glass reinforcing post 52, and reinforces the diaphragm 61 in the region over the post 52 and provides a symmetrical diaphragm response to pressure, both positive and negative. In other words, the added mass overlying the support post 52 aids in obtaining a proper output.

The device shown in FIGS. 1-7 reduces line pressure effects that tend to distort the sensing cells in oil filled isolated differential pressure sensors, and also provides a diaphragm for indicating the value of one of the pressures in addition to differential pressure in a reliable fashion using a single monolithic batch fabricated sensor.

Figure 6:
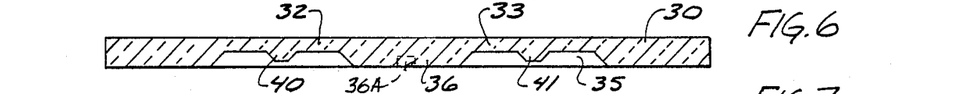
FIG. 6 is a sectional view taken as on line 6—6 in FIG. 5.

The rim portion 36 also can be partially cut through to reduce cross talk effects between the pressures acting on the two diaphragms 32 and 33. In other words, the section of rim portion 36 can be reduced midway between the cavities 34 and 35 transversely across the wafer.

This is shown in dotted lines at 36A in FIG. 6. This will tend to provide for better separation of the effects of the pressures. Of course, the chambers that define the diaphragms are sealed around their rims to base layer 25 when the sensors are manufactured.

A modified form of the invention, comprising a coplanar, side by side multiple function pressure sensor is shown in FIGS. 8 through 14. The sensor 80 comprises a monolithic sensor that has two side by side silicon pressure sensing diaphragms on one layer. The sensing means again is a variable resistance strain type, and all input pressure ports lie in a plane on the same side of the sensor, which is what is meant by "coplanar" as used in this specification.

When the input pressure ports are all on the same side of the sensors, the lead wires and wire bonds can be protected from the pressurized fluids forming the sensing media. In the device shown in FIGS. 8 through 14, a silicon isolator diaphragm with a push rod or post formed on it is mounted for isolating the fluid pressure media from the sensing means on the sensing diaphragm.

Figure 8:
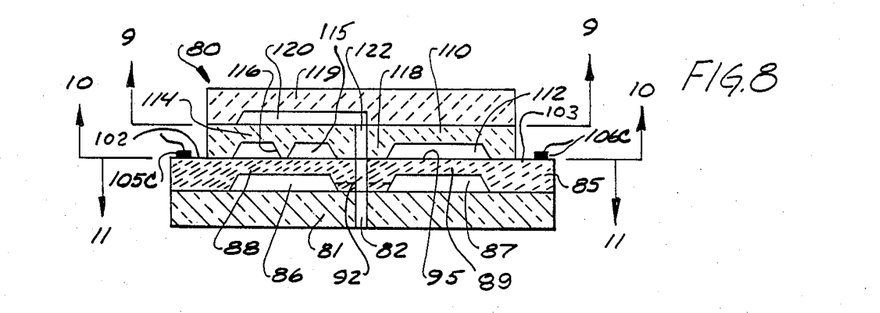
FIG. 8 is a sectional view of a modified form of the invention comprising a coplanar sensor that will sense differential and absolute pressure.

As shown in FIG. 8, the sensor 80 includes a base or mounting layer 81 that is made of glass or other brittle material to form a rigid, nondeflecting base. The base 81 is of suitable outer configuration, and is generally made in a batch process from a wafer with a number of sensors formed on the wafer and cut into individual sensors. The layers are suitably etched and processed individually to provide the necessary ports, recesses, and the like, and then the layers including the mounting or base layer are bonded together.

The base 81 has two inlet pressure sensing ports 82 and 83 (see FIG. 14) because there will be two input pressures, as will be more fully explained. A sensing diaphragm wafer or layer 85 is provided with a first rectangular shaped cavity 86, and a second rectangular shaped cavity 87. These are shown in FIG. 13, in bottom plan view. Also, for understanding, FIG. 12 is a sectional view along a different line from that shown in FIG. 8, generally along line 12—12 of FIG. 13. The outlines of the cavities 86 and 87 are also shown in dotted lines in FIG. 11. The cavities 86 and 87 form sensing diaphragms 88 and 89, respectively which are deflecting diaphragms that are edge supported with rim portions 90 that extend around the periphery of the layer 85. These sensing diaphragms 88 and 89 are separated and supported by a central rim portion 91 positioned between the diaphragms as shown. The outer surfaces of the rim are bonded to the base or mounting layer 81 to enclose the cavities 86 and 87.

Figure 11:
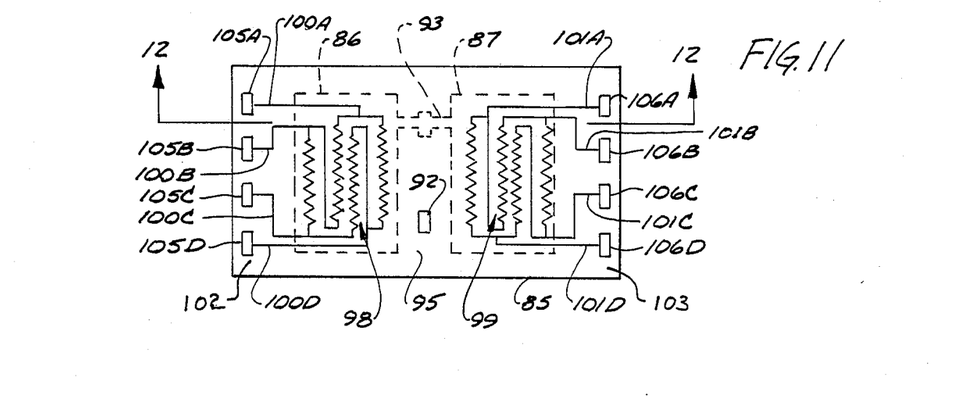
FIG. 11 is a top plan view of a layer which carries sensing means of the sensor of FIG. 8 and taken as on line 11—11 in FIG. 8.
Figure 12:
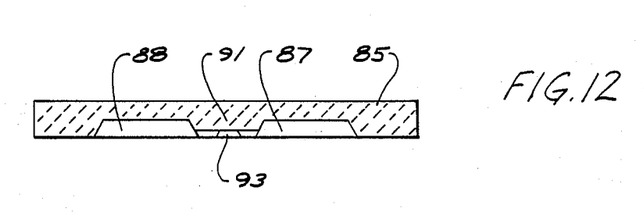
FIG. 12 is a sectional view taken on line 12—12 in FIG. 11.
Figure 13:
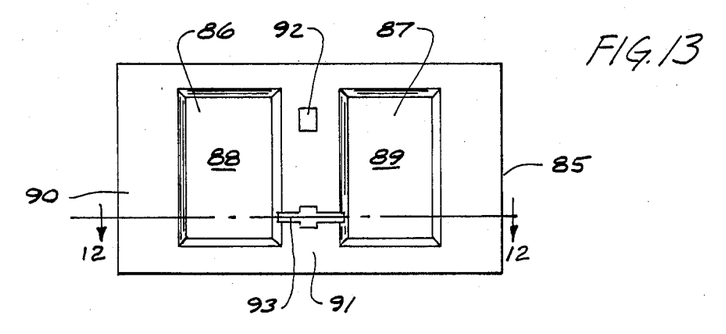
FIG. 13 is a bottom plan view of the sensor layer shown in FIG. 11.
Figure 14:
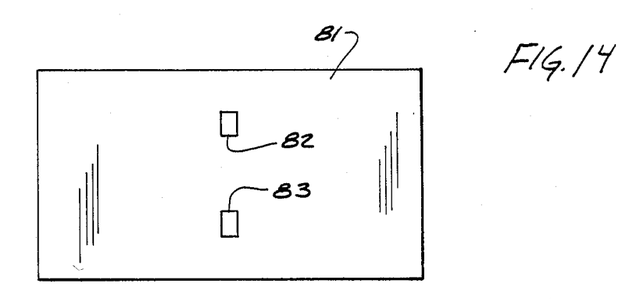
FIG. 14 is a bottom plan view of the sensor shown in FIG. 8.

The two cavities 86 and 87, are connected by a cross passageway 93 formed to extend across rim portion 91, as seen in FIGS. 12, 13 and in dotted lines in FIGS. 8 and 11. This cross passageway 93 is positioned to connect to the pressure port 83 formed through the base 81. Also, the wafer 85 has a through passageway 92 that aligns with the passageway 82 and permits pressure from the passageway 82 in the base to act up through the wafer 85 without communicating this pressure to either of the chambers 86 or 87. Thus, the fluid providing the pressure in passageway 92 does not act directly on either of the diaphragms 88 and 89. The layer 85, which comprises the silicon sensor layer, has sensing means on an upper surface 95 thereof. The sensing means comprise piezoresistive strain gage sensing resistors or elements 98, which are diffused or deposited into the upper surface of the diaphragm 88, and which form a resistance bridge of a suitable configuration. Surface 95 also has piezoresistive strain gage sensing resistors or elements 99 thereon which are diffused or otherwise suitably formed on the upper surface of the diaphragm 88 and which comprise sensing means for sensing deflections of the diaphragm 88. Electrical conductors 100A-100D are provided for connections from the bridge formed with sensing resistors 98, and electrical conductors 101A-101D are provided for connection from the bridge formed by the sensing resistors 99. Each of the conductors 100A-100D extends from its respective connection at a junction of the bridge comprising the sensing resistors 98, to edge portions 102 and 103 of the upper surface 95 of the layer 85. The edge portions 102 and 103 are near the opposite ends of the layer 85 and can be seen in FIG. 8. These portions 102 and 103 are exposed when the monolithic pressure sensor is completely formed.

The conductors 100A-100D extend along the upper surface 95 and are electrically connected to bonding pads 105A-105D deposited on surface portion 102, as seen in FIG. 11. The bonding pads 105A-105D are accessible for connection of suitable electrical leads and are on the exterior of the sensor, and isolated from the pressure media being sensed.

The conductors 101A-101D extend along the upper surface 95 to the surface portion 103, and are electrically connected to bonding pads 106A-106D, respectively, which are deposited on surface portion 103 of surface 95. The bonding pads 106A-106D are accessible from the exterior of the sensor, as can be seen in FIG. 8, and these pads are also isolated from the pressure media being sensed.

Figure 10:
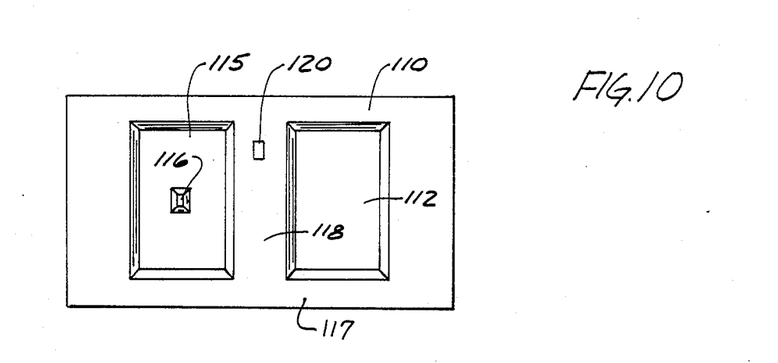
FIG. 10 is a bottom plan view of an intermediate layer of the sensor shown in FIG. 8 and taken as on line 10—10 in FIG. 8.

The diaphragm layer 85 has an isolation layer 110 supported thereon. The isolation layer 110 serves two functions. It has a cavity that forms a reference chamber 112 for sensing absolute pressure using the diaphragm 89, and layer 110 is used to form a differential pressure sensing diaphragm 114 overlying the diaphragm 88. As can be seen, the isolating layer 110 has a recess or chamber 112 defined therein, which is rectangular in shape and overlies the diaphragm 89. The isolating layer 110 also has a rectangular recess or cavity 115 that is side-by-side with the recess or chamber 112, and which overlies the diaphragm 88. The recess 115 forms a deflecting diaphragm 114 on layer 110. Recess or cavity 115 has a center boss or post 116 therein which is integral with diaphragm 114, as can be seen in FIG. 10.

The isolating layer 110 has a rim portion 117 around its outer periphery, and a central rim portion 118 is positioned between the two recesses 112 and 115 and overlies the central rim portion 91 formed on the layer 85, which is shown in FIGS. 12 and 13. The surfaces of the rim portions 117 and 118 rest on the upper surface 95 of the diaphragm layer 85, and are bonded thereto when the sensor is assembled. Preferably, the isolating layer 110 is a silicon wafer that is etched so that the layer 110 is shorter than the diaphragm layer 85 (but of the same width), to provide for the exposed surface portions 102 and 103 on which the bonding pads 105A-105D and 106A-106D are formed.

Figure 9:
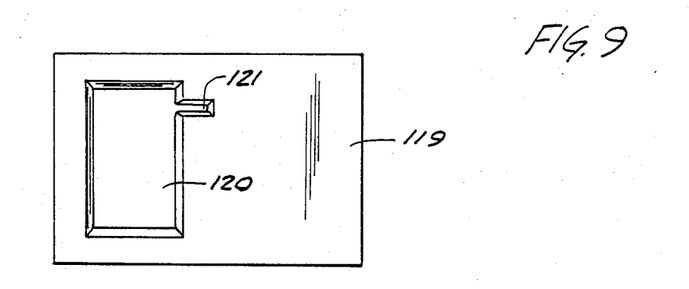
FIG. 9 is a bottom plan view of the upper layer of the sensor shown in FIG. 8, taken as on line 9—9 in FIG. 8.

A top or cap layer 119 has the same peripheral size as the layer 110, and includes a recess or cavity 120 that forms a pressure receiving chamber that overlies the diaphragm portion 114 formed by the recess 115. A channel 121 formed in the cap layer 119 extends laterally from the recess 120, as can be seen in FIGS. 8 and 9, and overlies (and thus is connected to) a passageway 122 formed in the central rim portion 118 of layer 110. Passageway 122, which forms a pressure passageway, joins the passageways 92 and 82 so that the fluid under pressure acting through the inlet port at passageway 82 will be provided to the chamber 120, thus tending to deflect the diaphragm 114 toward diaphragm 115, and through the post or boss 116, tending to deflect the diaphragm 88, which has the sensing resistors 98 thereon.

When all of the layers or wafers are processed to include necessary recesses, passageways, and pressure carrying channels as well, the layers are stacked and then bonded together in a monolithic assembly. It can be seen that the sensor assembly shown in FIG. 8 provides means for sensing differential pressure between the pressure inputs at passageways 82 and 83, as well as measuring the absolute pressure of the fluid medium supplied to passageway 83. The pressure in passageway 83 is carried by the channel 93 into the recess 87, causing deflection of the diaphragm 89, which is referenced to the chamber 110.

The pressure media is completely isolated from the sensing resistors and electrical conductors. The pressure inlet ports are all on the same side of the base 81, and the conductors and bonding pads are protected from the pressure media. The surface 95, with the variable sensing strain gauge resistors 98 and 99, are segregated from the pressure media by the isolation layer 110 and the top or cap layer 119. The rims around the recesses formed in the respective layers are bonded to the facing, contiguous surfaces of the adjacent layer for a complete seal of the pressure media from electrical parts.

Figure 15:
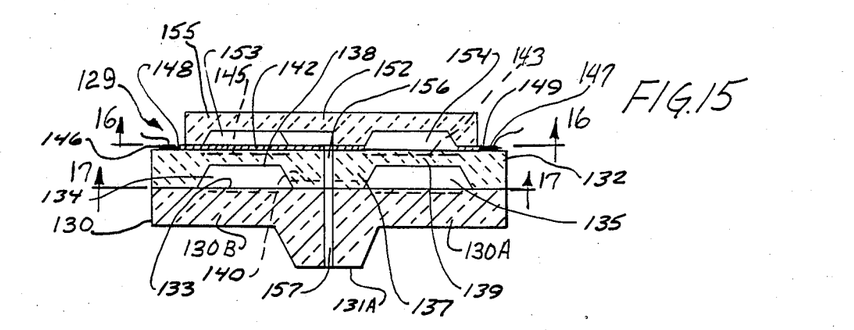
FIG. 15 is a cross sectional view of a modified and preferred sensor for sensing differential and absolute pressures, but utilizing a protective layer for isolating the sensing means to eliminate a layer used in FIG. 8, and illustrating a typical stress isolation mounting.
Figure 16:
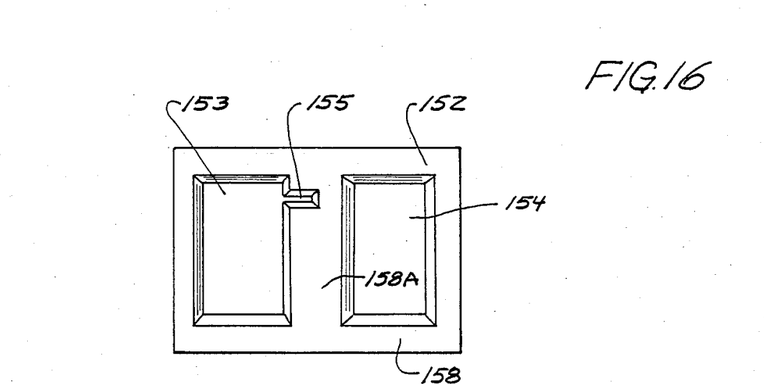
FIG. 16 is a view taken as on line 16—16 in FIG. 15.
Figure 17:
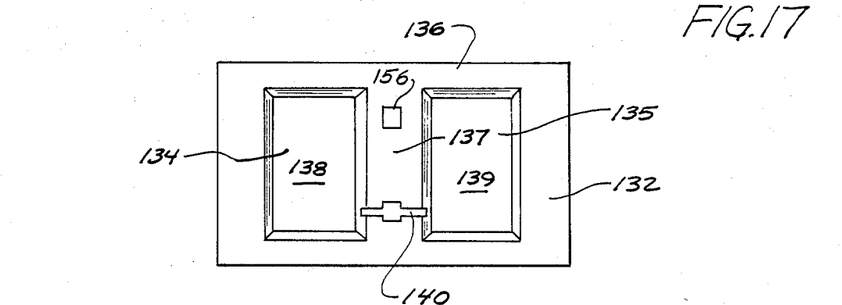
FIG. 17 is a view taken as on line 17—17 in FIG. 15.
Figure 18:
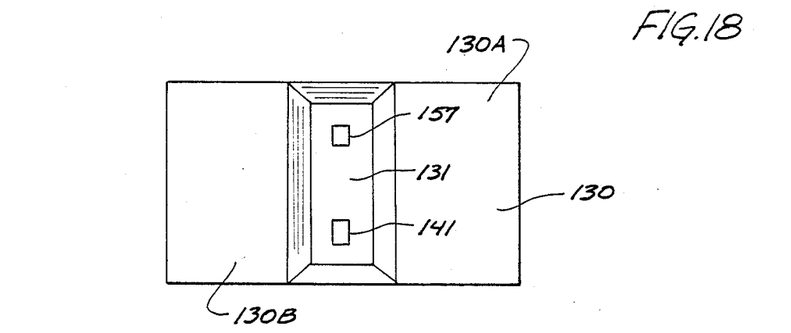
FIG. 18 is a bottom view of the sensor of FIG. 15.

FIGS. 15-18 shows a modified form of a differential-absolute pressure sensor made according to the present invention. FIG. 15 is similar to FIG. 8 except it uses a thin protective layer of material over the sensing means comprising strain gauges, and the base or mounting layer has a stress isolation mounting. A sensor 129 has a base or mounting layer 130 that corresponds to the base layer 81 insofar as the positioning of the pressure input ports and passageways is concerned. The base layer 30 has a stress isolation boss 131 that extends across the width of the base, as shown in FIG. 18. Base layer 130 is made of silicon, for example, and initially is as thick as the height including the boss 131, and then material is etched away at portions to leave the stress isolation boss 131 for each sensor being formed in the batch process. The base 130 thus has thinner, more easily deflected mounting portions 130A and 130B extending laterally from the boss.

A sensing diaphragm layer 132 (formed from a silicon or other suitable material wafer in a batch process) is positioned on the upper surface 133 of the base layer 130, and has recesses or cavities indicated at 134 and 135 formed therein as shown in FIG. 17. The recesses or cavities 134 and 135 are bounded by peripheral rims 136 and a central dividing rim portion 137 that is positioned between the recesses or cavities. Rim portion 137 corresponds to the rim portion 118 shown in FIG. 10. The recesses 134 and 135 form first and second sensing diaphragms 138 and 139, respectively, on diaphragm layer 132. A channel 140 shown in dotted lines is formed in the layer 132 and aligns with a pressure inlet passageway 141 through the base layer 130 so that pressure coming in from a fluid pressure source through passageway 141 will be provided to both of the recesses 134 and 135.

In this form of the invention, the sensing means comprising piezoresistive strain gauge resistors which are deposited or diffused into the surface of the respective diaphragms 138 and 139. The resistors are formed in the same manner as that shown in FIG. 11 and a view downwardly on the upper surface of layer 132 would appear identical to FIG. 11. The strain gauge resistors are indicated by dotted layers 142 and 143 on the respective upper surface of layer 132.

The resistors 142, at least, are covered and isolated from the fluid being sensed with a passivating protective coating or layer represented at 145 that overlies the surface of diaphragm layer 132, to isolate the sensing resistors from any fluid under pressure that might be applied to the diaphragm. There is no need to have such a passivating layer over diaphragm 139, and the strain gauge resistors in the region on the surface of diaphragm 139 are in a reference chamber and are not subjected to corrosive fluids.

The passivating layer 145 protects the piezoresistive strain gage resistors from corrosive fluids which are being sensed. The passivating layer 145 can be made up of several thin layers of material deposited in sequence, but the first layer has to be an insulating layer so that the strain gage resistors, which are deposited or diffused in the upper surface of the sensor diaphragms 138 are not shorted out by any subsequent metallic layer. The passivating layer can comprise Parylene coating, gold, chromium, polysilicon, silicon nitride, silicon dioxide, or combinations of these materials. Again, the selection of the passivating layer material depends on the types of contaminants anticipated in the pressure media for a particular application.

The passivating layer can be applied in a batch process where several diaphragm members are formed on a single silicon (or other material) wafer. When using the passivating materials listed (except Parylene coating), the regions on the surface of diaphragm layer 132 to be free of the passivating layer can be masked (such as above diaphragm 139). The passivating layer material is then deposited in the unmasked regions of the surface of the diaphragm layer. Preferred materials for the passivating layers are undoped polysilicon, $SiO_2$, $Si_3N_4$ and $TiO_2$ which are insulators. The passivating layer generally does overlie electrical conductors such as conductors 101 and 105 shown in FIG. 11, which are connected to the strain gauge resistors represented at 142 and 143.

Metallic bonding pads indicated generally at 146 and 147, respectively, are deposited on externally accessible end surface portions 148 and 149 of the upper surface of the diaphragm layer 132. The bonding pads are electrically connected to the conductors leading to the strain gauge resistors of the sensing means on the diaphragm. The bonding pads are used for attaching leads for external circuitry.

A top or cap layer 152 of glass or silicon, for example, is shorter than the diaphragm layer 132, to leave exposed surface regions of layer 132 on which the bonding pads 146 and 147 are mounted. The cap layer 152 has a pair of recesses or cavities indicated at 153 and 154 defined therein. The recess 154 overlies the sensing diaphragm 139, and the recess 153 overlies the sensing diaphragm 138. As can be seen, the recess or cavity 153 is connected through a suitable channel 155 to a passageway 156 that is provided in the central rim portion 137. The passageway 156 also aligns with a passageway 157 defined through the base member 130 and the mounting boss 131.

The recesses 153 and 154 are surrounded by a peripheral rim 158 and a center dividing rim 158A between the recesses. Utilizing the two pressure inlet passageways 141 and 157 provided in base layer 130, the sensor shown in FIGS. 15-18 will measure differential pressure between the pressures at these two passageways and also will measure the absolute pressures of one of the inputs. One pressure will be applied to the opposite side of the sensing diaphragm 138 above the passivating layer 145, and the second pressure coming through the passageway 141 and carried in channel or groove 140, will be applied to the undersides of both of the sensing diaphragms 138 and 139, to provide a differential pressure measurement at diaphragm 138 and a pressure measurement relative to a vacuum reference pressure which is provided in recess 154.

The respective layers are formed initially as wafers which contain several individual sensors and which wafers are bonded together to make monolithic sensors after the larger, bonded wafers are diced up. Sensor 129 has a stress isolation mounting surface 131A, and complete pressure media isolation of the sensing means on the respective sensing diaphragms 138 and 139. Because the pressure input passageways through the sensing diaphragms open through ports which are on the same surface of the base layer (surface 131A), the metallic bonding pads 146 and 147, as well as any portion of the conductors leading thereto from the piezoresistive strain gage resistors which are not covered by the protective passivating layer 145 or under the cap layer 152 are isolated from the corrosive media being sensed.

When Parylene coating is used as the passivating layer 145, the entire sensor 129 is formed as a unit, and the isolating, passivating layer is added after the individual sensors are cutout, and after bonding top or cap layer 152 is in place. The deposition of the Parylene is carried out in a known manner through passageways 156 and 157. The entire inner surface of cavity 153 would thus be coated and protected by the Parylene coating layer. The cavity 154, which is under vacuum, would not be coated and the piezo-resistive strain gage resistors 143 on diaphragm 139 would remain uncoated, but they are isolated from the fluid by cap layer 152.

Figure 19:
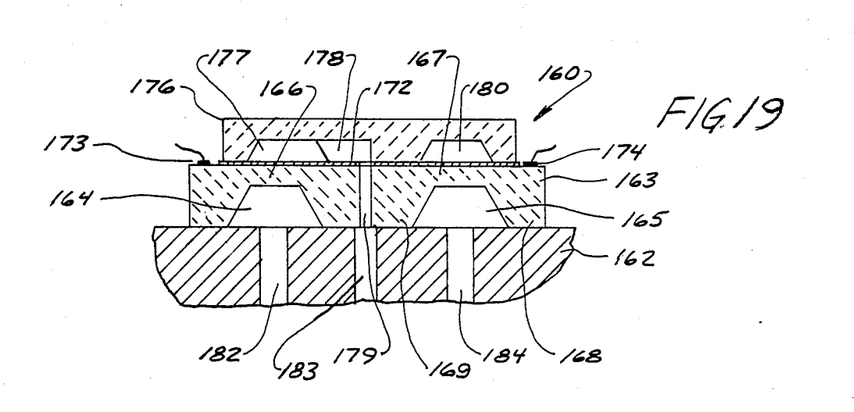
FIG. 19 is a fragmentary sectional view of a further modified form of a differential and absolute pressure sensor showing a protective coating on the sensing means and made to have enough rigidity in the sensor diaphragm layer to permit mounting the diaphragm on a housing wall without utilizing a base layer.

In FIG. 19, a further modified form of the sensor shown in FIGS. 8-14 and 15-18 is illustrated, and provides another combined differential and absolute pressure sensor shown at 160. In this form of the invention, a metal base or mounting layer 162 is used as a main support, and a silicon diaphragm wafer or layer 163 is bonded to one surface of base layer 162. The layer 163 is provided with first and second recesses or cavities 164 and 165, which define sensing diaphragms 166 and 167, respectively. The diaphragms 166 and 167 are surrounded by outer rim portions 168 and a central dividing rim portion 169.

Suitable sensing means such as sensing resistors as previously shown are diffused into or deposited onto surfaces of the sensing diaphragms as previously explained. A protective or passivating coating layer 172 is provided to isolate the sensing means from the pressure media. This layer can be applied in the same manner as layer 145 in FIG. 15, after the sensing means are formed on the diaphragms, and the protective coating is optional above diaphragm 167. The sensing resistors or other sensing means that may be formed on the diaphragms 166 and 167 have electrical conductors connected thereto that are also connected to bonding pads shown generally at 173 and 174, respectively. The bonding pads are on the upper surface of the sensing diaphragm layer 163 on opposite ends thereof, and are to the exterior of the ends of a cap or top layer 176. The layout of FIG. 11 represents the preferred arrangement for sensing strain gauges used with sensor 160.

Cap layer 176 is bonded to the upper surface of the diaphragm layer 163. The layer 176 has a cavity or recess 177 formed therein that overlies the sensing diaphragm 166. Recess 177 is connected with a short groove or channel 178 formed in layer 176 to a pressure passageway 179 in the central rim portion 169 of layer 163. The top or cap layer 176 also has a recess or cavity 180 defined therein that overlies the sensing diaphragm 167, and forms a reference chamber that will be under vacuum when the respective layers are all bonded together to form a monolithic sensor 160. It is the region within recess or cavity 180 where the passivating layer is not required.

The base 162 has a first pressure passageway 182 that opens to the recess or cavity 164 and which carries fluid under pressure from a source to one surface of sensing diaphragm 166. The base layer 162 also has a passageway 183 that aligns with the passageway 179, to provide a second fluid under pressure through passageway 183 to the opposite side of the sensing diaphragm 166 from the chamber 164, through channel 178 to cavity 177. The diaphragm 166 is subjected to two separate pressure sources and senses the differential in the two pressures.

A third passageway 184 defined in the base 162 is used for providing the fluid under pressure from one of the sources connected to passageways 182 and 183, or for providing an entirely separate pressure source to the recess 165, to act on the sensing diaphragm 167 relative to a reference pressure (vacuum) in the cavity or recess 180 which, when layer 176 is bonded in place, forms a reference chamber. The reference chamber is under vacuum and thus does not contain corrosive fluids.

In this form of the invention as well, the passivating protective layer or coating 172 isolates the sensing means, such as resistors on the upper surface of the sensing diaphragm 166 from the fluid or pressure media being sensed, and the cap layer 176 isolates the metallic bonding pads 173 and 174 from the pressure media being sensed. The pressure input passageways 182, 183 and 184 can be coupled to separate sources of pressure without subjecting the metallic bondng pads, or the electrical conductors or leads welded to the pads to the deleterious effects of the pressure media.

Sensor 160 senses both differential and absolute pressure in one small package with total isolation of the pressure media from the critical elements, utilizing a protective, passivating coating 172, and a cap layer 176 for forming the respective reference pressure cavity 180 and the chambers or cavities for providing differential pressure to the adjacent sensing diaphram 166. Thus, a compact monolithic sensor for sensing differential and absolute pressures, with total isolation for the delicate sensing resistors, and the electrical conductors and bonding pads is provided. The sensors 160 can be made in a batch process using wafers or discs on which a plurality of sensors are formed, and then cutting the wafers up.

Figure 20:
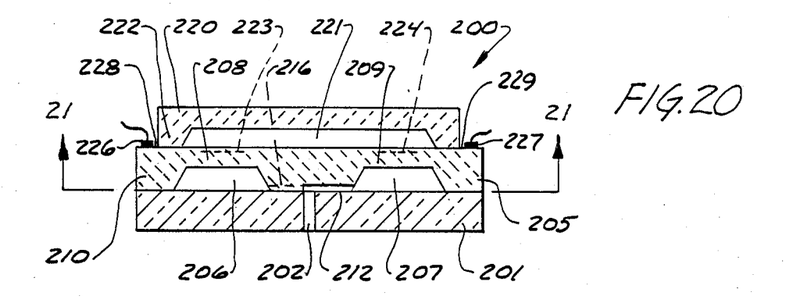
FIG. 20 is a sectional view of a further modified form of the invention that provides for sensing two absolute pressures.
Figure 21:
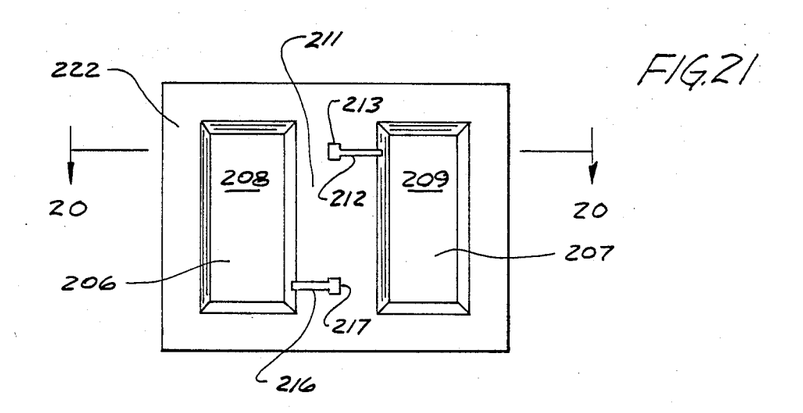
FIG. 21 is a bottom plan view of the layer carrying the sensing diaphragms in FIG. 20 and taken as on line 21—21 in FIG. 20.
Figure 22:
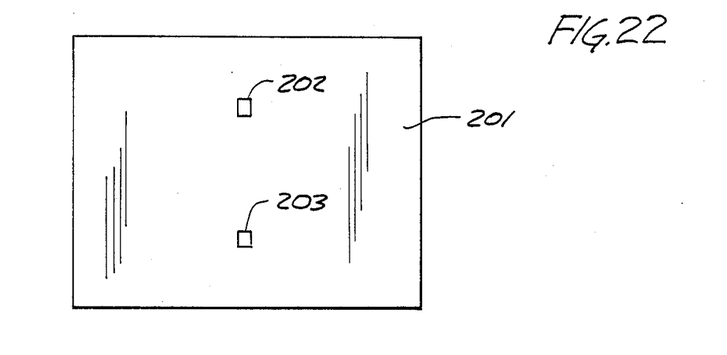
FIG. 22 is a bottom plan view of the device of FIG. 20.

A further modified form of the present invention is shown in FIGS. 20, 21 and 22, wherein a sensor 200 comprises a mounting or base layer 201 of glass or other suitable material that has a pair of pressure inlet ports leading to passageways 202 and 203, as can be seen in FIG. 22. The passageways 202 and 203 extend through the base 201, and both have inlet ends on the same side surface of the sensor so that the pressure sources can be connected easily. The base 201 supports a diaphragm layer 205 made of silicon or other suitable material, which has a pair of recesses or cavities 206 and 207 defined in one surface thereof to form sensing diaphragms 208 and 209, respectively. The recesses are surrounded by an outer rim 210, and a central dividing rim portion 211. Each of the recesses 206 and 207 forms a chamber. The recess 207 is open to passageway 202, and recess 206 is open to passageway 203. As can be seen in FIG. 20, the recess 206 is open through a channel 216 that extends laterally part-way across the central rim portion 211, and which has a head connector portion 217 that overlies and fluidly connects to the passageway 203. The recess 207 is connected with a channel shown in dotted lines at 212 in FIG. 20, and in solid lines in FIG. 21, that has a head 213 that aligns with the passageway 202. Thus, individual pressure sources can be connected to the passageways 202 and 203 and provided to the respective chambers 206 and 207 for subjecting the sensing diaphragms 208 and 209 to pressure.

An isolating cap layer indicated at 220, made of glass or silicon, preferably, is provided with a single cavity 221 that is of size to span both of the sensing diaphragms 209 and 208, and this forms a reference pressure chamber surrounded by a peripheral rim 222. The rim 222 overlies the rim 210 of the diaphragm layer, but the ends of the cap layer 220 are spaced inwardly from the ends of the diaphragm layer. Sensing means, comprising piezoresistive strain gage sensing resistors shown by dotted lines at 223 and 224 are provided on the respective sensing diaphragms 208 and 209. The resistors are thus open to the reference pressure cavity 221. The sensing resistors have conductors coupled thereto which are formed on the upper surface of the sensing diaphragm layer as previously shown. The conductors lead to metallic bonding pads 226 and 227, respectively, that are deposited or formed on outer edge surface portions 228 and 229 of the upper surface of the diaphragm layer 205. The bonding pads 226 and 227 in turn have leads attached thereto for connection to suitable circuitry. The leads are isolated from the pressure sensing media present in passageways 202 and 203.

The sensor 200 comprises a double absolute sensor, which can be used as a differential sensor using suitable electronic circuitry with two pressures being capable of being individually sensed by the sensing diaphragms 208 and 209, respectively, and the sensing means on the diaphragms. The ports opening to passageways 202 and 203 are on the same side of the sensor so isolation is easily achieved. In this form of the invention, the sensing resistors could be configured into a half bridge on each of the diaphragms 208 and 209 or a full bridge on each diaphragm can be used, as desired.

An absolute sensor assembly of modified form is shown at 240 in FIGS. 23–26. Sensor assembly 240 is a double absolute sensor and has an outer package cover that takes the place of the top or cap layer shown at 216 in FIG. 20. Also, the support or base layer of the sensor 240 is provided with a stress isolation mounting boss.

Figure 23:
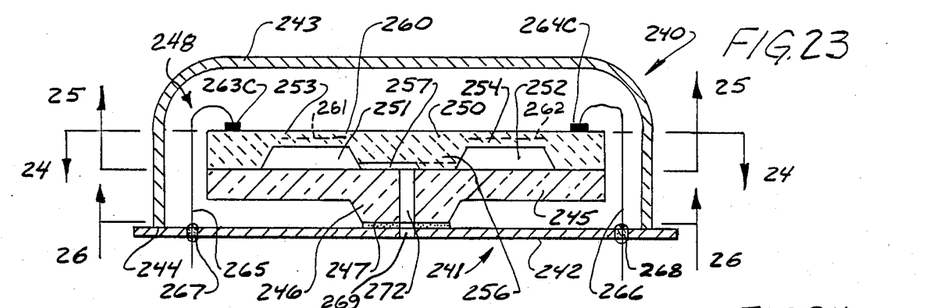
FIG. 23 is a sectional view of a further modified form of the present invention showing a sensor for sensing two absolute pressures mounted in an outer housing or package.
Figure 24:
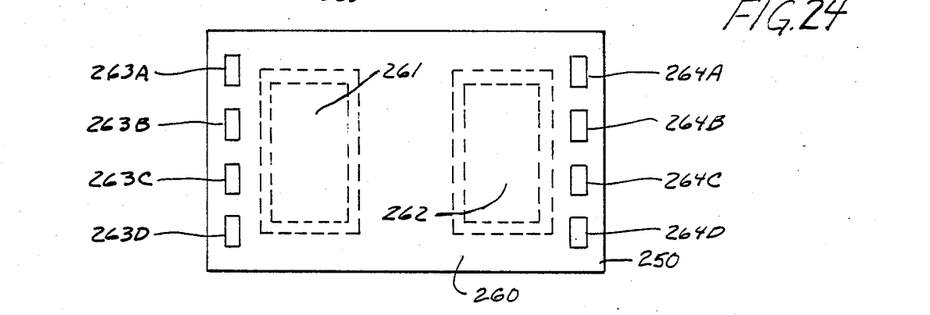
FIG. 24 is a top plan view of the sensor shown in FIG. 23 and taken on line 24—24 in FIG. 23.

The outer package 241 includes a base plate 242 and a cover 243 that are hermetically sealed together around a peripheral junction which is indicated generally at 244. A sensor 248 on the interior of the outer package includes a base or mounting layer or wafer 245 that has a stress isolation boss 246 formed thereon. The base has thinner support side portions 245A and 245B that extend laterally from the boss 246.

A mounting surface 247 on the boss 246 is suitably bonded to the upper surface of the mounting plate 242. The outer ledge portions 245A and 245B of the base layer 245 that extend laterally from the boss 246 are thin when compared to the thickness of the mounting boss to thereby provide stress isolation for the sensing diaphragms.

Figure 25:
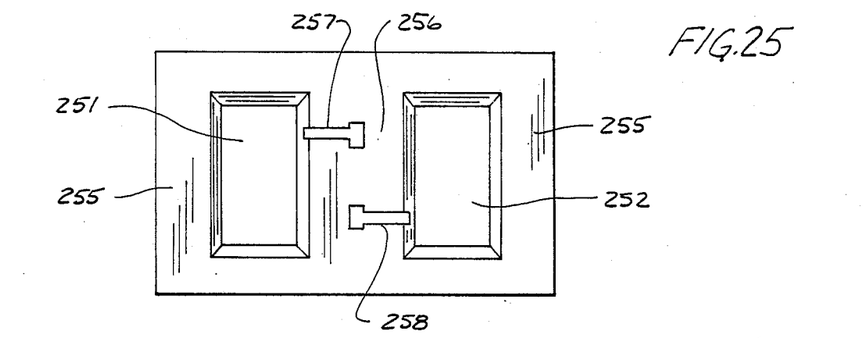
FIG. 25 is a bottom plan view of the top layer of the sensor shown in FIG. 24, and taken as on line 25—25 in FIG. 23.
Figure 26:
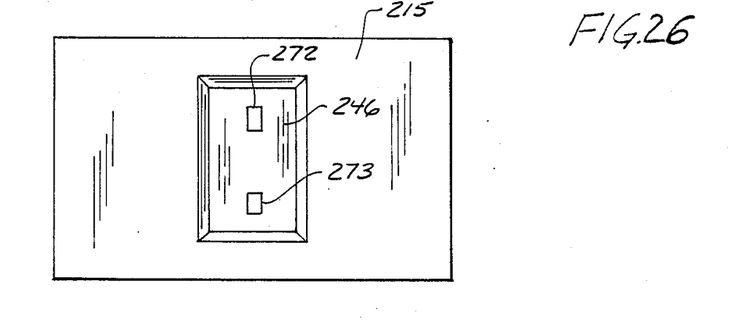
FIG. 26 is a bottom plan view of the sensor shown in FIG. 23, and taken as on line 26—26 in FIG. 23.

A diaphragm layer 250 is provided with cavities or recesses 251 and 252, which are made in accordance with standard procedures, to form sensing diaphragms 253 and 254, respectively. The sensing diaphragms are surrounded by outer rim portions 255, and a center divider rim portion 266. As can be seen in FIG. 25, the center divider rim portion 256 has channels 257 and 258 defined therein, extending generally from the center of the rim laterally in opposite direction so one channel opens to each of the respective cavities or recesses 251 and 252. The upper surface 260 of the diaphragm layer 250 has sensing means comprising piezoresistive strain gage resistors formed thereon in a conventional manner on the surface 260 in the regions of diaphragms 253 and 254. The resistors are in a bridge circuit and positioned on portions 261 and 262 of surface 260 above the respective diaphragms. These strain gauge bridges formed from the resistors have electrical conductors (not shown) that lead from the bridges to metallic bonding pads 263A–263D and 264A–264D. The outer cover 243 isolates the bonding pads 263A–263D and 264A–264D from ambient conditions. The leads connected to the bonding pads that are indicated generally at 265 and 266, respectively, and which form connections to external remote circuitry, are hermetically sealed where they pass through suitable openings 267 and 268, respectively, in the base 242.

The fluid under pressure can be provided through openings such as that shown at 269 in the base 242, which align with the passageways 271 and 272. The passageways 271 and 272 in turn align with the respective channels 257 and 258.

The sensor assembly 240 provides for sensing absolute pressure from two pressure sources. The interior of the outer cover is evacuated, and the chamber defined by the cover 243 thus is under a vacuum. The sensing diaphragms are therefore under a vacuum on one side, and are acted on by the individual fluid under pressure provided from the passageways 272 and 273 on the other side of the diaphragms. Deflection of the sensing diaphragms 253 and 254, which is sensed by suitable sensing means, comprising the piezoresistive bridges indicated schematically at 261 and 262, determine individually the absolute pressure of the two different sources.

A double differential pressure sensing arrangement is shown in a modified form of the invention illustrated in FIGS. 27–31. In this form of the invention, the double differential pressure sensor indicated at 280 has a mounting or base layer 281 made of glass, silicon or other suitable rigid material. The base layer 281 supports a first diaphragm layer 282, comprising the sensing diaphragm layer. The sensing diaphragm layer 282 has cavities or recesses 283 and 284 defined in one surface thereof, and these recesses define sensing diaphragms 285 and 286. The diaphragm layer or wafer 282 has suitable sensing means thereon comprising piezoresistive strain gage resistors on the upper surface of the diaphragm layer, and while these resistors are not shown in detail, they are generally in the region outlined as a bridge region indicated at 287 and 288, respectively, in FIG. 26. The sensing resistors in region 287 and 288 are preferably diffused in the upper surface of the diaphragms 285 and 286, and have electrical conductors, as previously shown, leading to metallic bonding pads shown generally at 289 and 290 in FIG. 27. These bonding pads are on exposed end surface portions of the diaphragm layer 282.

Figure 27:
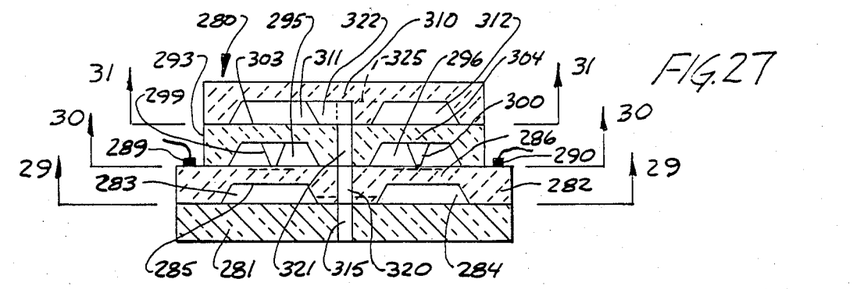
FIG. 27 is a sectional view of a further modified form of the present invention showing a sensor for sensing two differential pressures.
Figure 28:
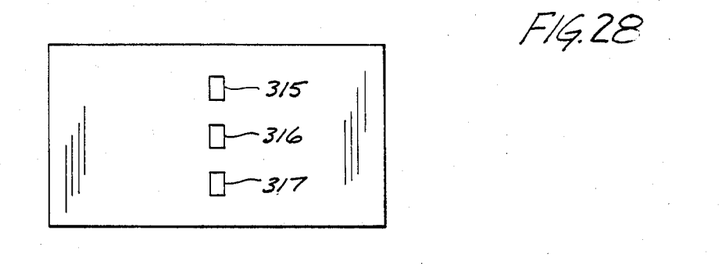
FIG. 28 is a bottom plan view of the sensor of FIG. 27.

An isolation layer indicated generally at 293 is formed of a suitable material such as silicon, and has cavities or recesses 295 and 296 defined therein that overlie the sensing diaphragms 285 and 286. A peripheral rim portion 297 surrounds the recesses 295 and 296, and a central divider rim portion 298 is formed between the recesses. Each of the recesses has an integral boss, shown at 299 and 300, respectively, that is of size to bear against the upper surface of the respective sensing diaphragm 285 and 286 that is formed in the sensing diaphragm layer 282.

The isolation layer is of smaller size than the sensing diaphragm wafer or layer 282, so that the surface portions of the sensing diaphragm layer 282 where the bonding pads 289 and 290 are placed are exposed, as shown. The rim portions 297 and 298 are sealingly bonded onto the upper surface of the diaphragm layer 282 when the sensors are formed. The isolation layer recesses form isolation diaphragm portions 303 and 304, respectively, which will deflect under pressures (or forces) on their upper surfaces. A top or cap layer 310 is made also of a silicon or glass, or other brittle material, and has a pair of cavities or recesses 311 and 312 defined therein which are surrounded by a peripheral rim portion 313, and a central rim portion 314 that divides the two recesses 311 and 312.

Sensor 280 is a double differential pressure sensor, using one pressure source that is common to both sensing diaphragms. Signals indicating the respective differential in pressure between that common pressure and two additional separate pressure sources is provided. In order to do this, the base layer 281 has three pressure sensing passageways shown at 315, 316 and 317, respectively, with the passageway 316 being fluidly coupled to both of the recesses 283 and 284 of the sensing diaphragm layer 282. A channel 318 shown in FIG. 29 and in dotted lines in FIG. 27 connects passageway 316 to both recesses 283 and 284. The same pressure is thus present on the bottom side of both of the sensing diaphragms 285 and 286.

Figure 29:
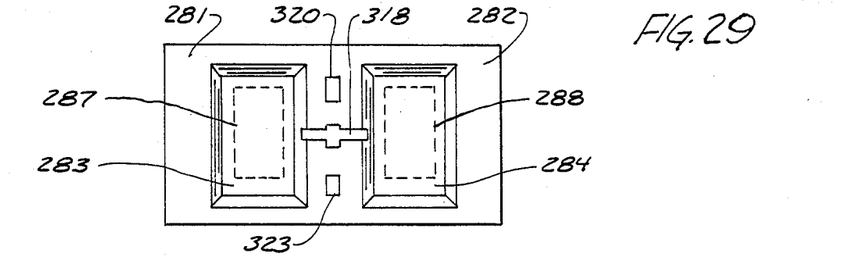
FIG. 29 is a bottom plan view of the diaphragm layer of the sensor of FIG. 27 and taken as on line 29—29 in FIG. 27.
Figure 30:
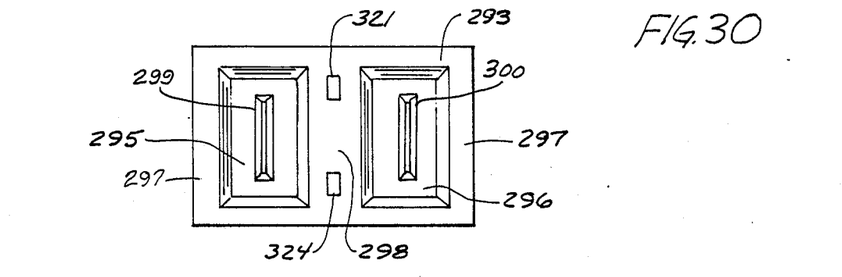
FIG. 30 is a bottom plan view of an isolation layer used with the sensor of FIG. 27, and taken as on line 30—30 of FIG. 27.
Figure 31:
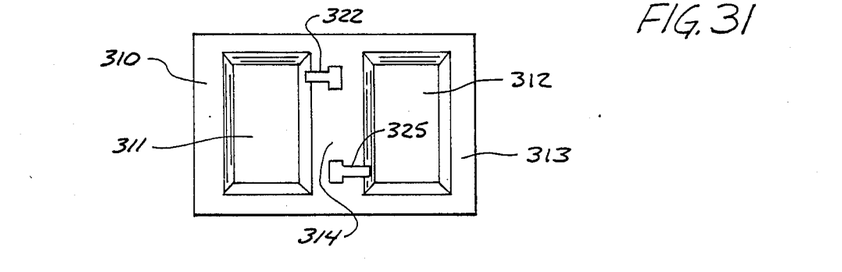
FIG. 31 is a bottom plan view of the top layer of the sensor shown in FIG. 27, and taken as line 31—31 in FIG. 27.

The top or cover layer 310 is made to provide the second and third fluid pressures to the respective sensing diaphragms. The fluid under pressure provided to passageway 315 passes through a separate passageway 320 defined through the sensing diaphragm layer 282, as shown in FIG. 29 and also shown in FIG. 27. This passageway 320 is isolated from the channel 318, and aligns with the passageway 321 in the isolation layer 293. The passageway 321 aligns with and opens to a channel 322 defined in cap layer 310. The channel 322 is open to the recess 311.

The passageway 317 in turn aligns with and is open to a passageway 323 that extends through the sensing diaphragm layer 282, and also aligns with a passageway 324 that passes through the isolation layer 293. The passageway 324 opens to a channel 325 in cap layer 310. The channel 325 is coupled to the recess 312 in the same manner that the channel 322 is coupled to the recess 311.

The respective layers are bonded together to form a monolithic pressure sensor 280, and the respective rim portions are sealed around the recesses to the next layer so that the interior recesses form sealed chambers. The bosses 299 and 300 are in contact with the respective upper surfaces of the sensing diaphragms 285 and 286, and thus transfer forces acting on the diaphragm sections 303 and 304 from pressures in the respective chambers 311 and 312 to the diaphragms 285 and 286. The diaphragms 285 and 286 will deflect if the pressure in the chambers 283 and 284, respectively, is less than that in the chambers 311 and 312, and an output will result.

In this manner, the pressure sensor provides a signal representing the differential pressure between a common pressure supplied to the undersides of both diaphragms and two additional different pressure sources. The monolithic sensor assembly includes means for isolating the sensitive electrical connectors from the pressure media, and the mounting layer or base has all of the pressure passageways opening to ports on one surface for easy connection to the pressure sources without having the bonding pads and sensitive electrical elements subjected to the pressure media.

Low cost, side-by-side, batch fabricated sensors that provide pressure media isolation and a wide variety of options for sensing are disclosed.

Although the present invention has been described with reference to preferred embodiments, workers skilled in the art will recognize that changes may be made in form and detail without departing from the spirit and scope of the invention.

What is claimed is:

1. A media-isolated multiple pressure sensor for providing outputs representing pressures of pressurized media coupled thereto, comprising:
    a first layer having sensing means for providing the outputs disposed on a first surface thereof aligned with first and second cavities extending into the first layer from a second surface of the first layer opposite the first surface to form first and second pressure sensing diaphragms respectively in the first layer;
    connection means electrically coupled to the sensing means and extending over a portion of the first surface for electrically coupling the outputs to a location spaced away from the sensor;
    reference means coupled to the first surface for providing a media-free reference pressure to the first diaphragm; and
    mounting means sealingly affixed to the second surface surrounding the cavities for mounting the sensor, the mounting means having at least a first passageway therethrough for coupling the pressurized media to the diaphragms such that the sensing means and connection means are isolated from contact with the media.

2. The sensor of claim 1 wherein the reference means comprises a second layer sealingly bonded to the first surface and having a sealed cavity therein overlying at least the first diaphragm.

3. The sensor of claim 2 wherein the reference pressure is a vacuum.

4. The sensor of claim 2 wherein the mounting means comprises a third layer sealingly bonded to the second surface.

5. The sensor of claim 4 wherein the first layer comprises a first channel extending along the second surface from the first passageway to the first cavity for coupling media thereto.

6. The sensor of claim 5 wherein the first layer comprises a second channel extending along the second surface from the first passageway to the second cavity for coupling media thereto.

7. The sensor of claim 1 wherein the mounting means comprises a stress isolation layer having a mounting boss on a side thereof opposite from the first layer, and reduced thickness portions extending from said mounting boss to position underlying and enclosing the cavities forming the first and second pressure sensing diaphragm in the first layer.

8. The sensor of claim 1 wherein the reference means comprises a second layer having third and fourth cavities therein opening to and covering the first and second sensing means, said second layer overlying said first layer and being smaller in dimension than the first layer on at least one end thereof to expose a portion of the first surface outside of the second layer, said second layer being bonded to said first layer, the third cavity providing a reference pressure to the first diaphragm, and the first and second layer having passageway means therethrough for providing a pressure source to the fourth cavity that overlies the second diaphragm.

9. The sensor of claim 1 wherein said mounting means comprises a second layer sealingly bonded to the second surface of the first layer, and having first and second passageways opening to the first and second cavities, respectively, and wherein said reference means comprises a third layer having third and fourth cavities therein corresponding in position to the cavities in said first layer, and being sealingly bonded to the first surface of the first layer, said third cavity providing a reference pressure to the first diaphragm, and said fourth cavity overlying said second diaphragm, and a separate passageway opening through said second layer and said first layer, and open to said fourth cavity for providing a third pressure to the fourth cavity whereby the second diaphragm responds to differentials in pressure on opposite sides thereof, and a layer deposited on the sensing means on the second diaphragm overlying the first surface of the second diaphragm at least in the area enclosed by the fourth cavity to isolate the sensing means on the second diaphragm.

10. The apparatus as specified in claim 9 wherein said third layer has a dimension that provides for exposing a portion of the first surface of the first layer when the third layer is bonded to the first layer, said connection means comprising conductor means leading from the sensing means to the exposed portions of the first surface of the first layer, and bonding pad means connected to said conductor means for forming part of the connection means at a location isolated from pressurized media provided through the first, second and separate passageways.

11. The sensor of claim 9 wherein said passageways all open to ports on the same surface of the second layer.

12. The sensor of claim 1 wherein said reference means comprises an outer case mounted around the sensor to define a case chamber, a pressure opening in said case aligning with the passageway of the sensor, the case being sealed around the pressure opening with respect to the sensor to isolate the media provided to the passageway from the chamber defined by the case; the connection means including leads that pass through openings in the case and are hermetically sealed with respect thereto.

13. A media isolated multiple pressure sensor for providing outputs representing pressures of fluid media coupled thereto comprising:
 a first layer having first and second oppositely facing surfaces, and having cavities extending into the layer from the second surface to form first and second pressure sensing diaphragms respectively in the first layer, and sensing means disposed on the first surface aligned with the first and second cavities to sense deflections of the diaphragms as a result of pressure acting thereon;
 connection means electrically coupled to the sensing means, respectively, and extending across a portion of the first surface for electrically coupling the outputs from the sensing means to remote circuitry;
 a second layer mounted on the first surface of said first layer and providing a reference pressure to at least the first diaphragm, said second layer being spaced inwardly from the edge of the first layer in at least one portion of the first layer to expose a part of the first surface, said second layer being bonded to the first layer to seal around the first and second diaphragms; said connection means extending outwardly to the exposed portion;
 bonding pad means mounted on said one portion of the first surface; and
 a mounting layer mounted on the second surface of the first layer and sealingly bonded thereto to enclose the first and second cavities, and separate passageway means in said mounting layer opening to a surface of said mounting layer opposite from the first layer, said separate passageway means being coupled to the respective cavities.

14. The sensor of claim 13 wherein said second layer has rim means defining third and fourth cavities therein overlying said first and second cavities of the first layer, layer means on said first layer at least in the portion encompassed by said fourth cavity to isolate the sensing means on the first surface of the first layer from exposure to the fourth cavity, and separate passageway means to provide a fluid pressure to said fourth cavity, said separate passageway means passing through the mounting layer and the first layer to the second layer and opening to the fourth cavity.

15. The sensor of claim 14 wherein said mounting layer comprises a stress isolating layer having a mounting boss in the center portions thereof, and having thinner portions extending laterally from said mounting boss and underlying the first and second cavities of the first layer mounted on said mounting layer.

16. The sensor of claim 14 wherein said passageway means in said second layer is coupled to provide the same pressure to each of the first and second cavitiy.

17. The sensor of claim 13 wherein said second layer has a single cavity therein that provides a reference pressure to both of the first and second diaphragms formed on the first layer.

18. The sensor of claim 14 and a third layer interposed between the first layer and the second layer, said third layer having cavities therein that align with the first and third cavities and second and fourth cavities respectively, and having deflecting diaphragm portions formed by the cavities in said fourth layer, and mechanical boss means for coupling deflections of the diaphragms formed on said fourth layer caused by pressures in the cavities on said third layer to the diaphragms on the first layer.

* * * * *